United States Patent
Czeromin

(10) Patent No.: US 11,605,510 B2
(45) Date of Patent: *Mar. 14, 2023

(54) SWITCHGEAR WITH AN OPTICAL MONITORING SYSTEM

(71) Applicant: SIEMENS AKTIENGESELLSCHAFT, Munich (DE)

(72) Inventor: Kay Czeromin, Buettelborn (DE)

(73) Assignee: Siemens Aktiengesellschaft, Munich (DE)

(*) Notice: Subject to any disclaimer, the term of this patent is extended or adjusted under 35 U.S.C. 154(b) by 384 days.

This patent is subject to a terminal disclaimer.

(21) Appl. No.: 16/797,212

(22) Filed: Feb. 21, 2020

(65) Prior Publication Data

US 2020/0273636 A1 Aug. 27, 2020

(30) Foreign Application Priority Data

Feb. 21, 2019 (DE) .............................. 102019202363

(51) Int. Cl.
*H01H 1/00* (2006.01)
*H01H 9/02* (2006.01)
*H02B 13/035* (2006.01)
*G01D 5/26* (2006.01)
*G01H 9/00* (2006.01)
*G02B 6/00* (2006.01)

(52) U.S. Cl.
CPC .......... *H01H 1/0015* (2013.01); *G01D 5/268* (2013.01); *G01H 9/004* (2013.01); *G02B 6/00* (2013.01); *H01H 9/02* (2013.01); *H02B 13/0356* (2013.01); *H01H 2001/0021* (2013.01); *H01H 2009/0292* (2013.01)

(58) Field of Classification Search
None
See application file for complete search history.

(56) References Cited

U.S. PATENT DOCUMENTS

| | | | |
|---|---|---|---|
| 10,341,540 B2 | 7/2019 | Huempfner | |
| 2018/0168054 A1 | 6/2018 | Scarlata et al. | |
| 2020/0275064 A1 | 8/2020 | Czeromin | |

FOREIGN PATENT DOCUMENTS

| | | | | |
|---|---|---|---|---|
| CA | 3070504 A1 | 8/2020 | | |
| DE | 10330177 A1 | * 2/2005 | ......... | A61B 1/00165 |
| DE | 102015218645 B3 | 2/2017 | | |
| EP | 0122595 A1 | 10/1984 | | |
| EP | 805535 A2 | * 11/1997 | ............. | H02B 13/02 |
| EP | 0805535 A2 | 11/1997 | | |
| EP | 1184950 A1 | 3/2002 | | |
| GB | 599421 A | 3/1948 | | |
| JP | H07226131 A | 8/1995 | | |
| WO | WO-8302166 A | * 6/1983 | ............. | G02B 23/26 |
| WO | 2018106891 A1 | 6/2018 | | |

* cited by examiner

*Primary Examiner* — Chad H Smith
(74) *Attorney, Agent, or Firm* — Laurence A. Greenberg; Werner H. Stemer; Ralph E. Locher

(57) ABSTRACT

A switchgear includes an optical monitoring system for examining switchgear switching positions. At least one isolating switch is accommodated in an encapsulated housing. The encapsulated housing is disposed in an installation housing. The encapsulated housing has a first transparent window in one region. A fiber-optic system leads from an outer side of the installation housing to the first transparent window.

17 Claims, 2 Drawing Sheets

SWITCHGEAR WITH AN OPTICAL MONITORING SYSTEM

CROSS-REFERENCE TO RELATED APPLICATION

This application claims the priority, under 35 U.S.C. § 119, of German Patent Application DE 10 2019 202 363, filed Feb. 21, 2019; the prior application is herewith incorporated by reference in its entirety.

BACKGROUND OF THE INVENTION

Field of the Invention

The invention relates to a switchgear, in particular a gas-insulated switchgear, with an optical monitoring system.

Camera systems are often employed in the prior art for examining the switching position of an isolating switch or of a three-position switch.

A camera system for checking the switching position in gas-insulated switchgear is known from German Patent Application DE 10 2015 218 645, corresponding to U.S. Pat. No. 10,341,540.

Camera systems have the disadvantage that on one hand they are potentially liable to malfunction, the systems are expensive, and in the case of an electrical current failure they can only be operated with suitable reserve electrical supplies. A continuous electrical supply must, in particular, be present for such systems, and a computer, e.g. a mobile notebook, tablet, a permanently installed computer or another displaying system is also necessary.

BRIEF SUMMARY OF THE INVENTION

It is accordingly an object of the invention to provide a switchgear with an optical monitoring system, which overcomes or avoids the hereinafore-mentioned disadvantages of the heretofore-known devices of this general type.

With the foregoing and other objects in view there is provided, in accordance with the invention, a switchgear with an optical monitoring system for examining a switchgear switching position, the switchgear includes:
at least one isolating switch,
the at least one isolating switch is accommodated in an encapsulated housing,
the encapsulated housing is disposed in an installation housing, and the encapsulated housing has a first transparent window in one region,
a fiber-optic system leads from an outer side of the installation housing to the first transparent window, the fiber-optic system includes at least one first fiber bundle with a first end and a second end that captures an optical picture of the at least one isolating switch through the first transparent window and transmits it to an observation system disposed at the first end at the installation housing, and the fiber-optic system includes at least one second fiber bundle with a third end and a fourth end, and
light of a light source can be guided from the third end to the fourth end in the region of the first transparent window and can be guided through the first transparent window.

An optical monitoring system is thus provided in which a direct observation of the isolating switch is possible by using a fiber-optic system. The system is thus, in principle, not dependent on a residual electrical supply, but an external light source can be used such as, for example, a torch or flashlight, ambient light, or ambient light collected at the third end of the second fiber bundle. Alternatively, a light source can also be provided at the third end of the second fiber bundle, which light source has either an interface at the installation housing or a suitable energy store, such as for example a battery, an accumulator and/or a capacitor, for the supply of electricity. The term isolating switch is to be understood in this case to refer both to an isolating switch as well as to a multi-position switch with an isolating function. The term fiber bundle is to be understood to refer to glass and/or plastic fibers guided together that are constructed to guide light in the interior of the individual fibers. A fiber bundle, in particular the second fiber bundle, can be formed of a single fiber or of a plurality of fibers, and the first fiber bundle preferably can be formed of a plurality of fibers.

The transparent window is a window that is transparent at least in the visible spectrum of the light and is made for example of glass, plastic or casting resin. The use of separate fiber bundles enables a separate illumination and onward transmission of the view of the isolating switch or switches. The terms picture, optical picture, image and optical image refer to an image of the object or objects that are to be observed through the optical monitoring system. Preferably a respective fiber bundle for illuminating the isolating switch or switches and a fiber bundle is used to guide an optical image of the isolating switch or switches to the observation system.

It is preferred that the observation system is disposed at the front of the installation housing, in particular physically close to one or more operating units of the switchgear such as, for example, operating units for isolating switches and/or multi-position switches.

It is also preferred that the switchgear is a medium-voltage switchgear or high-voltage switchgear, wherein medium voltage refers in particular to voltages of 1000 V and more, and high voltage refers to voltages of more than 52 kV.

It is further preferred that the gas-insulated switchgear contains a fluoroketone and/or fluoronitrile and/or olefin, in particular a hydrofluoroolefin, and/or nitrogen and/or $CO_2$ as an insulating gas and/or switching gas.

It is also preferred that the observation system protrudes out of the installation housing through an opening, or is visible from outside the installation housing through a further transparent window, i.e. that the image of the isolating switch or switches is visible.

It is also preferred that in the region of the first transparent window, the fiber-optic system has:
imaging optics, or
imaging optics with a wide-angle objective lens, or
imaging optics with the imaging properties of a wide-angle objective lens, through which an image of the at least one isolating switch can be captured, i.e. is observable, with the second end of the first fiber bundle, and which, in a special implementation, optionally projects light out of the second fiber bundle into the region of the at least one isolating switch. Alternatively the second fiber bundle can also be disposed so as to surround the imaging optics.

It is further preferred that the observation system, the fiber-optic system and the imaging optics are implemented in a module, and the module is disposed removably in the installation housing. Such a modular configuration enables the operation of a plurality of switchgears with one monitoring system or at least fewer monitoring systems than switchgears.

It is also preferred that the light source is an external illumination source, such as, for example, a torch or flashlight, ambient light, or ambient light collected at the third end of the second fiber bundle, and the light can be coupled into the third end by a light-coupling device.

It is also preferred that the light source is disposed in the region of the third end of the second fiber bundle, and the light source can be supplied with electrical current, voltage and/or energy from the installation housing, i.e. in particular from outside the installation housing. It is, in particular, preferred that electronics recognize whether an external current source and/or voltage source is connected to the light source, and the external current source and/or voltage source is then automatically used to supply the light source, or the external current source and/or voltage source is only used to supply the light source when an internal current source and/or voltage source is not available to supply the light source and/or does not make sufficient current and/or voltage available. It is, in particular, also preferred if an internal light source with an internal electrical supply, an internal light source with an external electrical supply, or an external light source can serve as the light source, i.e. all three alternatives are simultaneously available. Such a configuration in principle further increases the security against failure of such an optical monitoring system.

It is further preferred that the at least one isolating switch is at least a three-position switch, and all three positions, i.e. all three switching positions, of the at least one three-position switch can be captured as an image through the first transparent window and the optical picture can be transmitted to the observation system disposed at the first end at the installation housing.

In particular it is preferred that the switchgear is a three-phase switchgear with three or six three-position switches, and all three switching positions of the three or six three-position switches, i.e. nine or eighteen switching positions, can be captured as an image through the first transparent window and the optical picture can be transmitted to the observation system disposed at the first end at the installation housing.

It is also preferred that the observation system includes an eyepiece that optically enables the observation of the picture from the encapsulated housing, in particular that the eyepiece represents an image with a size of a few millimeters from the encapsulated housing in enlarged form, in particular enlarged by a factor of five or ten or fifteen or twenty or twenty five or thirty, with a magnification by a factor of twenty to thirty being particularly preferred.

It is also preferred that one or a plurality of reference markings are disposed in the observation module which mark at least one position of the at least one isolating switch or of the at least one three-position switch. These reference markings thus help the identification of the switch position that is present. In particular these are disposed in such a way that the reference markings, when observed through the observation module, each lie optically parallel to one of the possible switch positions.

In particular it is preferred that a respective reference marking is present for each position of one of these isolating switches or three-position switches, in particular that identical switching positions at each isolating switch or three-position switch are marked in the same manner, for example with the same color and/or the same symbol.

It is also preferred that one or a plurality of reference markings are disposed in the imaging optics which mark at least one position of the at least one isolating switch or of the at least one three-position switch. These reference markings thus help the identification of the switch position that is present. In particular these are disposed in such a way that the reference markings, when observed through the observation module, each lie optically parallel to one of the possible switch positions.

In particular it is preferred that a respective reference marking is present for each position of one of these isolating switches or three-position switches, in particular that identical switching positions at each isolating switch or three-position switch are marked in the same manner, for example with the same color and/or the same symbol.

It is also preferred that the first fiber bundle is formed with two or more fibers, and the second fiber bundle is formed with one or more fibers.

It is further preferred that the first fiber bundle is formed with a thousand or more fibers.

It is also preferred that the second fiber bundle is formed with up to four or with up to sixteen fibers.

In particular it is preferred that the second fiber bundle is split, divided, at its fourth end into individual fibers, and the individual fibers of the second fiber bundle are disposed as a ring around the first fiber bundle. This enables an even and/or adequate and/or emphasized illumination of the isolating switch or switches or three-position switches.

In particular it is also preferred that the second fiber bundle is split or divided at its fourth end into individual fibers, and the individual fibers of the second fiber bundle are distributed like a ring, but not evenly around the ring, that is the conceptual ring of fibers, disposed around the first fiber bundle and/or the imaging optics. In this way it is ensured that more remote regions in the encapsulated housing are also illuminated evenly and/or with emphasis, i.e. that the relevant regions with the isolating switch or switches or three-position switches are illuminated evenly and/or with emphasis.

It is also preferred that the first fiber bundle and the second fiber bundle include a protective cladding, in particular a common protective cladding in those regions in which they are routed parallel or together.

Other features which are considered as characteristic for the invention are set forth in the appended claims.

Although the invention is illustrated and described herein as embodied in a switchgear with an optical monitoring system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
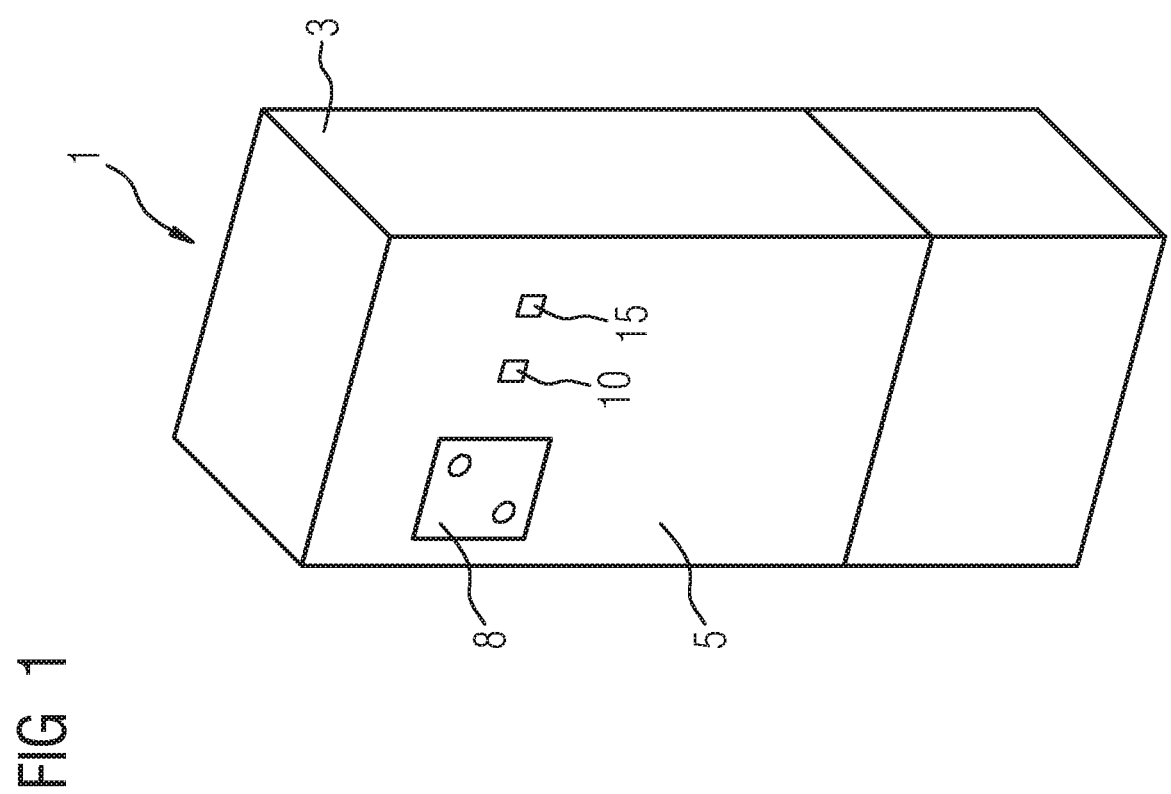
FIG. 1 is a diagrammatic, perspective view of a switchgear according to the invention.

Referring now to the figures of the drawings in detail and first, particularly, to FIG. 1 thereof, there is seen a switchgear 1 according to the invention having an installation housing 3. An operating unit 8 is disposed in an installation housing front 5 of the installation housing 3. The installation housing front 5 also includes an observation system 10 and a light source or a light-coupling-in region 15.

Figure 2:
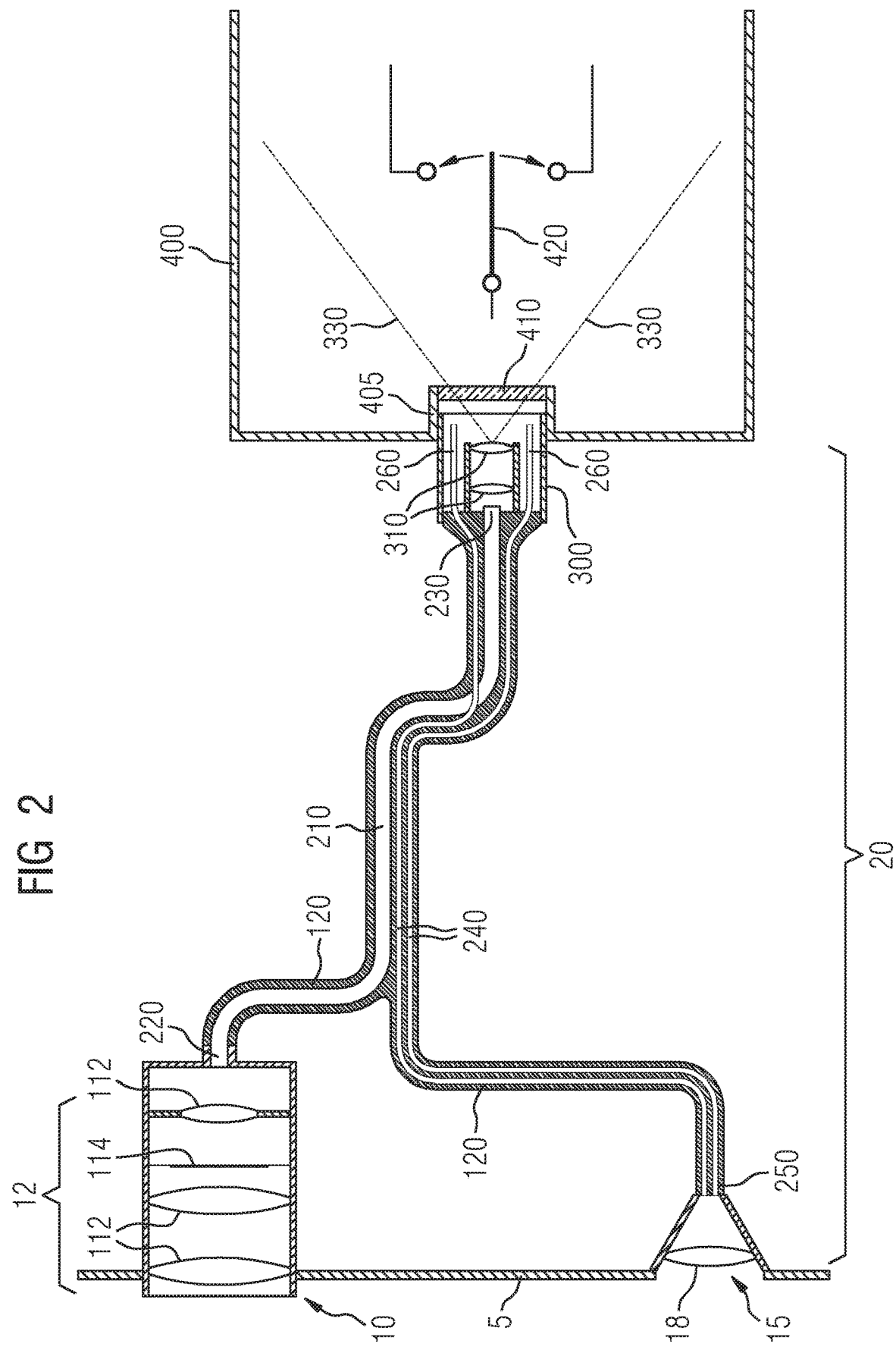
FIG. 2 is an enlarged, fragmentary, sectional view of the switchgear according to the invention.

FIG. 2 shows a diagrammatic illustration of a section of the switchgear 1 according to the invention having an optical monitoring system 20 for examining switchgear switching positions. The observation system 10 is routed through the installation housing front 5. The observation system 10 in this case includes, by way of example, three lenses 112 of an imaging system 12 to form an eyepiece and an optional reference marking 114. The reference marking 114 is applied to a transparent carrier that is fixed inside the observation system 10. A first end 220 of a first fiber bundle 210 is connected to the observation system 10. The first fiber bundle 210 is routed inside a protective cladding 120 to imaging optics 300. The imaging optics 300 include, in this example, two lenses 310. The imaging optics 300 furthermore adjoin a first transparent window 410. The first transparent window 410 in this case is installed in an encapsulated housing 400 of the switchgear 1 by using a flange 405. An isolating switch, in this case, more precisely, a three-position switch 420, is disposed in a field of view 330 in the encapsulated housing 400 of the switchgear 1.

The light-coupling-in region 15 is also disposed in this case on the installation housing front 5. The light-coupling-in region 15 in this case additionally includes an inward light-coupling element 18, in this case a lens, alternatively a lens system.

Alternatively, the light source 15 can also be provided at the installation housing front 5 or in the installation housing 3 and an interface for an external electrical supply of the light source 15 can also be provided at the installation housing front 5 or the installation housing 3.

A second fiber bundle 240 has a third end 250 and a fourth end 260. The second fiber bundle 240 begins with the third end 250 and runs from the light-coupling-in region 15 to the fourth end 260 in the imaging optics 300. The second fiber bundle 240 is led between the light-coupling-in region 15 and the imaging optics 300 within the protective cladding 120. Additionally, individual fibers of the second fiber bundle 240 inside the imaging optics 300 can also be led in a protective cladding 120 in a non-illustrated manner. The second fiber bundle 240 is represented herein by way of example by two fibers, however it may, in particular, be a multiplicity of fibers.

In the preferred embodiment shown herein, the first fiber bundle 210 and the second fiber bundle 240 are disposed in a common protective cladding 120 in a region in which they are brought together.

In the illustrated example, the imaging optics 300 include two lenses 310 of the imaging optics 300, in order to couple an image of the interior of the encapsulated housing 400 with the three-position switch 420 into the first fiber bundle 210.

In order to achieve an optimized illumination of the three-position switch 420, in the illustrated exemplary embodiment, the fibers of the second fiber bundle 240 at the fourth end 260 of the second fiber bundle 240 are led to the end of the imaging optics 300 that adjoin the first transparent window 410. The fibers of the second fiber bundle 240 are disposed in this case in a preferred embodiment in the form of a ring around the lenses 310 of the imaging optics 300, or are disposed around them in smaller bundles.

This preferred embodiment furthermore has a shape of the flange 405 or the window flange 405 of the encapsulated housing 400 which corresponds to the external form of the imaging optics 300, so that in particular in the case of a modular construction of the imaging optics 300, it is ensured that the imaging optics 300 are disposed in a predefined position in the flange 405 or the window flange 405 of the encapsulated housing 400, that a correct observation of the three-position switch or switches 420 is thus enabled, and that the reference marking 114 also shows the correct positions. This can in particular furthermore preferably be achieved in such a way that the imaging optics 300 can only be inserted into the flange 405 or window flange 405 of the encapsulated housing 400 in a predefined alignment and will be or are latched there.

LIST OF REFERENCE SIGNS

1 Switchgear;
3 Installation housing;
5 Installation housing front;
8 Operating unit;
10 Observation system;
15 Light source or light-coupling-in region;
18 Inward light-coupling element, for example an optical lens;
20 Optical monitoring system;
112 Lenses of the imaging system of the observation system 10;
114 Reference markings, in particular on a transparent carrier;
120 Protective cladding;
210 First fiber bundle;
220 First end of the first fiber bundle 210;
230 Second end of the first fiber bundle 210;
240 Second fiber bundle;
250 Third end of the second fiber bundle 240;
260 Fourth end of the second fiber bundle 240;
300 Imaging optics;
310 Lenses of the imaging optics 300;
330 Field of view through the first transparent window 410 into the encapsulated housing 400 of the switchgear 1;
400 Encapsulated housing of the switchgear 1;
405 Flange or window flange of the encapsulated housing 400;
410 First transparent window in the flange or window flange 405;
420 Isolating switch or three-position switch in the encapsulated housing 400.

The invention claimed is:
1. A switchgear, comprising:
an installation housing having an outer side and an internal current and/or voltage source;
an optical monitoring system for examining switchgear switching positions, said monitoring system including:
an encapsulated housing disposed in said installation housing, said encapsulated housing having a region with a first transparent window;
at least one isolating switch accommodated in said encapsulated housing;
an observation system disposed at said installation housing;
a fiber-optic system leading from said outer side of said installation housing to said first transparent window;
said fiber-optic system including at least one first fiber bundle having a first end and a second end, said at least one first fiber bundle configured to capture an optical picture of said at least one isolating switch through said first transparent window and transmit the optical picture to said observation system disposed at said first end;

said fiber-optic system including at least one second fiber bundle having a third end and a fourth end; and a light source disposed at said third end for emitting light to be guided from said third end to said fourth end in a region of said first transparent window and to be guided through said first transparent window, said light source being supplied with external electrical current, voltage, and/or energy from an external source outside said installation housing; and electronics configured for recognizing whether the external source is connected to said light source and automatically supplying said light source when said internal current and/or voltage source is not available to supply the light source and/or does not make sufficient current and/or voltage available.

2. The switchgear according to claim 1, wherein said observation system protrudes out of said installation housing through an opening or is visible from outside said installation housing through a further transparent window.

3. The switchgear according to claim 1, wherein said fiber-optic system includes, in said region having said first transparent window:

imaging optics, or imaging optics with a wide-angle objective lens, or imaging optics with imaging properties of a wide-angle objective lens, through which an image of said at least one isolating switch can be captured with said second end of said first fiber bundle.

4. The switchgear according to claim 3, which further comprises a module removably disposed in said installation housing, said observation system, said fiber-optic system and said imaging optics being implemented in said module.

5. The switchgear according to claim 1, which further comprises a light-coupling device, said light source including an external illumination source emitting light to be coupled into said third end by said light-coupling device.

6. The switchgear according to claim 1, wherein said at least one isolating switch is at least a three-position switch, and all three switching positions of said at least one three-position switch are configured to be captured as an image through said first transparent window for transmitting the optical picture to said observation system disposed at said first end at said installation housing.

7. The switchgear according to claim 6, wherein:

the switchgear is a three-phase switchgear;

said at least one isolating switch is three or six three-position switches; and all three switching positions of said three or six three-position switches are configured to be captured as an image through said first transparent window for transmitting the optical picture to said observation system disposed at said first end at said installation housing.

8. The switchgear according to claim 1, wherein said observation system includes an eyepiece optically enabling an observation of the picture from said encapsulated housing.

9. The switchgear according to claim 6, which further comprises one or a plurality of reference markings disposed in said observation system for marking at least one position of said at least one isolating switch or of said at least one three-position switch.

10. The switchgear according to claim 3, wherein said at least one isolating switch is at least a three-position switch, and one or a plurality of reference markings are disposed in said imaging optics for marking at least one position of said at least one isolating switch or of said at least one three-position switch.

11. The switchgear according to claim 1, wherein said first fiber bundle is formed with two or more fibers, and said second fiber bundle is formed with one or more fibers.

12. The switchgear according to claim 11, wherein said first fiber bundle is formed with one thousand or more fibers.

13. The switchgear according to claim 11, wherein said second fiber bundle is formed with up to four fibers.

14. The switchgear according to claim 11, wherein said second fiber bundle is formed with up to sixteen fibers.

15. The switchgear according to claim 1, wherein said second fiber bundle is divided at said fourth end into individual fibers, said individual fibers being disposed in a ring around said first fiber bundle.

16. The switchgear according to claim 1, wherein said fiber optics system includes imaging optics with a lens disposed at said fourth end, said second fiber bundle has fibers, said fibers being disposed in a ring around said lens.

17. The switchgear according to claim 1, wherein said light source includes an external light source emitting light.

* * * * *